US007892488B2

(12) United States Patent
Speldrich et al.

(10) Patent No.: US 7,892,488 B2
(45) Date of Patent: Feb. 22, 2011

(54) THERMAL LIQUID FLOW SENSOR AND METHOD OF FORMING SAME

(75) Inventors: Jamie W. Speldrich, Freeport, IL (US); Scott E. Beck, Murphy, TX (US); Richard W. Gehman, Freeport, IL (US); Martin G. Murray, Freeport, IL (US); Ulrich Bonne, Hopkins, MN (US)

(73) Assignee: Honeywell International, Inc., Morristown, NJ (US)

( * ) Notice: Subject to any disclaimer, the term of this patent is extended or adjusted under 35 U.S.C. 154(b) by 1247 days.

(21) Appl. No.: 11/352,774

(22) Filed: Feb. 10, 2006

(65) Prior Publication Data

US 2007/0186643 A1   Aug. 16, 2007

(51) Int. Cl.
*G01N 21/00* (2006.01)
*G01F 1/68* (2006.01)
(52) U.S. Cl. .................................... 422/58; 73/204.26
(58) Field of Classification Search .................. 422/58; 73/204.26
See application file for complete search history.

(56) References Cited

U.S. PATENT DOCUMENTS

| | | | |
|---|---|---|---|
| 4,440,014 A | | 4/1984 | Hattori et al. |
| 4,651,564 A | | 3/1987 | Johnson et al. ............... 73/204 |
| 4,956,793 A | * | 9/1990 | Bonne et al. ................... 702/50 |
| 5,050,429 A | | 9/1991 | Nishimoto et al. ....... 73/204.26 |
| 5,494,562 A | * | 2/1996 | Maley et al. ................. 257/414 |
| 5,883,310 A | * | 3/1999 | Ho et al. ....................... 73/766 |
| 6,184,773 B1 | * | 2/2001 | Bonne et al. ................... 338/25 |
| 6,460,411 B1 | * | 10/2002 | Kersjes et al. ............ 73/204.26 |
| 6,500,490 B1 | * | 12/2002 | Yan .......................... 427/376.2 |
| 6,500,547 B1 | * | 12/2002 | Potyrailo ..................... 428/422 |
| 6,526,823 B2 | * | 3/2003 | Tai et al. .................. 73/204.26 |
| 6,527,835 B1 | * | 3/2003 | Manginell et al. ............. 96/102 |
| 6,631,638 B2 | * | 10/2003 | James et al. ............. 73/204.26 |

(Continued)

FOREIGN PATENT DOCUMENTS

EP        0522567 A1    1/1993

OTHER PUBLICATIONS

*Accuglass T-14*, Honeywell Electronic Materials.

(Continued)

*Primary Examiner*—Lore Jarrett
(74) *Attorney, Agent, or Firm*—Matthew F. Lambrinos; Luis M. Ortiz; Kermit D. Lopez (57) ABSTRACT

A thermal liquid flow sensor and method of forming same. The sensor has a substrate and one or more sensing elements, disposed on the substrate, for sensing a property of a liquid. The liquid flow sensor, which can be for example a microsensor having a microbrick® structure, has a hydrophilic layer which is disposed on the substrate and covers the sensing element(s). The hydrophilic layer is preferably formed from a spin on glass material, such as for example a silicate or phosphosilicate. A silicon nitride layer can be disposed on the sensing element(s) and interpose the substrate and the hydrophilic layer. The silicon nitride layer can be oxidized, for example, by means of plasma oxidation or oxygen ion implantation so to form the hydrophilic layer thereon. A variety of other hydrophilic compounds can be utilized to form the hydrophilic layer such as, gold, palladium and diamond like carbon.

9 Claims, 4 Drawing Sheets

U.S. PATENT DOCUMENTS

| | | | |
|---|---|---|---|
| 6,684,694 B2* | 2/2004 | Fujiwara et al. | 73/204.26 |
| 6,762,672 B2* | 7/2004 | Taguchi et al. | 338/25 |
| 6,794,981 B2 | 9/2004 | Padmanabhan et al. | 338/25 |
| 6,871,537 B1* | 3/2005 | Gehman et al. | 73/204.26 |
| 7,106,167 B2* | 9/2006 | Parsons | 338/25 |
| 7,109,842 B1* | 9/2006 | Padmanabhan et al. | 338/25 |
| 7,603,898 B2* | 10/2009 | Speldrich | 73/204.26 |
| 2002/0190839 A1* | 12/2002 | Padmanabhan et al. | 338/13 |
| 2005/0022594 A1 | 2/2005 | Padmanabhan et al. | |
| 2007/0251292 A1* | 11/2007 | Beck et al. | 73/1.35 |

OTHER PUBLICATIONS

*MEMS-Based Flow Controller for Flow Cytometry*, E. Cabuz, J. Schwichtenberg, B. DeMers, E. Satren, A. Padmanabhan, C. Cabuz, Honeywell International.

*Enabling Technologies for a Personal Flow Cytometer (Part I)*, C. Cabuz, A. Padmanabhan, B. Fritz, E. Cabuz, J. Schwichtenberg, P. Reutiman, B. Demers, T. Rezachek, E. Satren, F. Battrell, Honeywell International Inc.

* cited by examiner

THERMAL LIQUID FLOW SENSOR AND METHOD OF FORMING SAME

TECHNICAL FIELD

Embodiments are generally related to sensors, and in particular, to liquid flow sensors. Embodiments are also related to thermal liquid flow sensors in the form of MEMS devices and methods of manufacturing such thermal liquid flow sensors. Embodiments are additionally related to micro liquid flow sensor dies having microbrick® or microbridge configurations.

BACKGROUND OF THE INVENTION

Liquid flow sensors in the form of MEMS devices are configured to measure properties of liquid in contact with the sensors and provide output signals representative of the liquid flow rates. Thermal liquid flow sensors are configured to heat the liquid and measure the resulting thermal properties of the liquids to determine flow rates. Such thermal flow sensors generally include a microsensor die that includes a substrate and one or more elements disposed on the substrate for heating the liquid and sensing the liquid thermal properties. A microbridge sensor, for example as detailed in U.S. Pat. No. 4,651,564 to Johnson et al., is an example of such a thermal flow sensor. The microbridge sensor includes a flow sensor chip which has a thin film bridge structure thermally insulated from the chip substrate.

A pair of temperature sensing resistive elements are arranged on the upper surface of the bridge either side of a heater element such that, when the bridge is immersed in the liquid stream, the flow of the liquid cools the temperature sensing element on the upstream side and promotes heat conduction from the heater element to thereby heat the temperature sensing element on the downstream side. The temperature differential between the upstream and downstream sensing elements, which increases with increasing flow speed, is converted into an output voltage by incorporating the sensing elements in a Wheatstone bridge circuit such that the flow speed of the gas or liquid can be detected by correlating the output voltage with the flow speed. When there is no liquid flow, there is no temperature differential because the upstream and downstream sensing elements are at similar temperatures.

However, microbridge liquid sensors intermittently exhibit drift behavior making the sensor measurements susceptible to error and instability.

Another example of a thermal sensor is a microstructure thermal flow sensor having a microsensor die with a Microbrick® or microfill structure which sensor is more suited to measuring liquid flow and properties under harsh environmental conditions. Note that the term Microbrick® is a registered trademark of Honeywell Inc. of Morristown, N.J. The microstructure flow sensor uses a Microbrick® or micro fill forming a substantially solid structure beneath the heating/sensing elements and has a passivation layer isolating the heating/sensing elements from the fluid so that the sensor is less susceptible to the effects of the fluid. Examples of such microbrick thermal flow sensors are disclosed in U.S. Pat. No. 6,794,981 entitled "Integratable-fluid flow and property microsensor assembly" issued on Sep. 21, 2004, to Padmanabhan et al. Although this type of microstructure sensor is capable of reliable and rapid-response operation under harsh environments, this type of sensor still generally exhibits drift behavior which leads to measurement error.

The aforementioned problems demonstrate that there is a need to provide a liquid flow sensor which is capable of accurately and reliably measuring liquid flow in a stable manner.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect to provide for an improved liquid flow sensor.

It is another aspect, to provide for a thermal liquid flow sensor which can provide flow measurements in a stable manner.

It is another aspect to provide for a method of forming an improved thermal liquid flow sensor.

The aforementioned aspects of the invention and other objectives and advantages can now be achieved as described herein.

According to one aspect, a liquid flow sensor has a substrate and one or more sensing elements, disposed on the substrate, for sensing a property of a liquid. A hydrophilic layer is disposed on the substrate and covers the sensing element(s).

The hydrophilic layer can be formed from a spin on glass material, such as for example a silicate or phosphosilicate. A silicon nitride layer can be disposed on the sensing element(s) and interpose the substrate and the hydrophilic layer. The silicon nitride layer can be oxidized, for example, by means of plasma oxidation or oxygen ion implantation so to form the hydrophilic layer thereon.

Alternatively, the hydrophilic layer can be formed from modified diamond-like carbon, zeolite, silanol group bearing silicone resin and titanium oxide, titania and a disperse phase constituted of silica or alumina, oligomer reactive with silanol, or polymer reactive with silanol, or a hydrophilic metal, such as for example palladium (Pd) or gold (Au).

Alternatively, the hydrophilic layer can be formed from a fluorine-containing polymer having a hydrophilic functional group, such as, for example hydroxyl, carboxyl, salt of carboxylic acid, sulfonic acid group or salt of sulfonic acid. Also, the hydrophilic layer can be formed from polyvinylprollidonenpolyurethane interpolymer, polyacrylic acid polymer or acrylamide-acrylic acid copolymer.

According to another aspect, a thermal liquid flow sensor has a microsensor die which has a substrate and at least one pair of temperature sensing elements disposed on the substrate. Also disposed on the substrate, preferably, between the sensing elements, is a heater for heating the liquid being measured. A hydrophilic layer is disposed on a surface region of the sensor die so as to cover the temperature sensing element and/or the heater. The liquid flow sensor advantageously exhibits enhanced sensing performance as a result of a reduction in or elimination of sensor drift normally found in existing liquid flow sensors.

By providing a hydrophilic layer on the temperature sensing elements and heater, the liquid flow sensor now has a hydrophilic surface which has a high affinity to liquid and which repels minute air bubbles away from the sensor surface. In this manner, the hydrophilic layer has a strong affinity to liquid causing minute air bubbles to be forced away from the active surface region of the sensor during sensor operation. The hydrophilic layer therefore advantageously preserves the sensor die surface and liquid interface intact and heat transfer is not obstructed by gas bubbles or film. The thermal liquid flow sensor can therefore provide liquid flow measurements in a more stable manner than existing thermal liquid flow sensors.

Preferably, the sensor die is fabricated in the form of a microbrick® structure providing a substantially solid structure beneath the temperature and heating elements. Alternatively, the sensor die can be fabricated in the form of a microbridge structure heating and temperature sensing elements which are substantially located on a bridge formed on the substrate.

Preferably, a silicon nitride layer is disposed on the temperature sensing elements and heater and interposes the hydrophilic layer and the substrate.

Preferably, the hydrophilic layer comprises a spin on glass material. The SOG material can be for example a silicate, such as PB-ACCUFLO T-30, or a phosphosicliate, such as PII4 both of which are commercially available from Honeywell Speciality Materials of 101 Columbia Rd. Morristown, N.J. 07962-2497. Consequently, fabrication of the microsensor die and hydrophilic layer thereon can be implemented by means of semiconductor and integrated circuit fabrication techniques apparent to those skilled in the art. Preferably, the microsensor die is mass produced by means of wafer level processing techniques and subsequently singulated, that is, separated from adjacent packages, using known wafer dicing methods.

Alternatively, the hydrophilic layer can be formed on the silicon nitride layer by oxidizing the surface of the silicon nitride layer.

According to another aspect, a method of manufacturing a thermal liquid flow sensor comprises providing a substrate, forming one or more pairs of temperature sensing elements on the substrate, forming a heating element on the substrate, between the pair(s) of temperature sensing elements, and forming a hydrophilic layer on the substrate, the hydrophilic layer covering the one or more pairs of temperature sensing elements and/or the heating elements.

Preferably, the method of forming the hydrophilic layer comprises applying a spin on glass material on the substrate.

Also preferably, the method further comprises forming a silicon nitride layer on the substrate and covering the temperature sensing and heating elements, the silicon nitride layer interposing the hydrophilic layer and the substrate. The method of forming the hydrophilic layer can comprise oxidizing the surface of the silicon nitride layer.

According to yet another aspect, a method of forming a hydrophilic layer on a thermal liquid flow sensor which has a substrate and sensing and heating elements thereon, comprises, rotating the substrate, applying a spin on glass coating material on the substrate, and curing the spin-on glass on the substrate.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
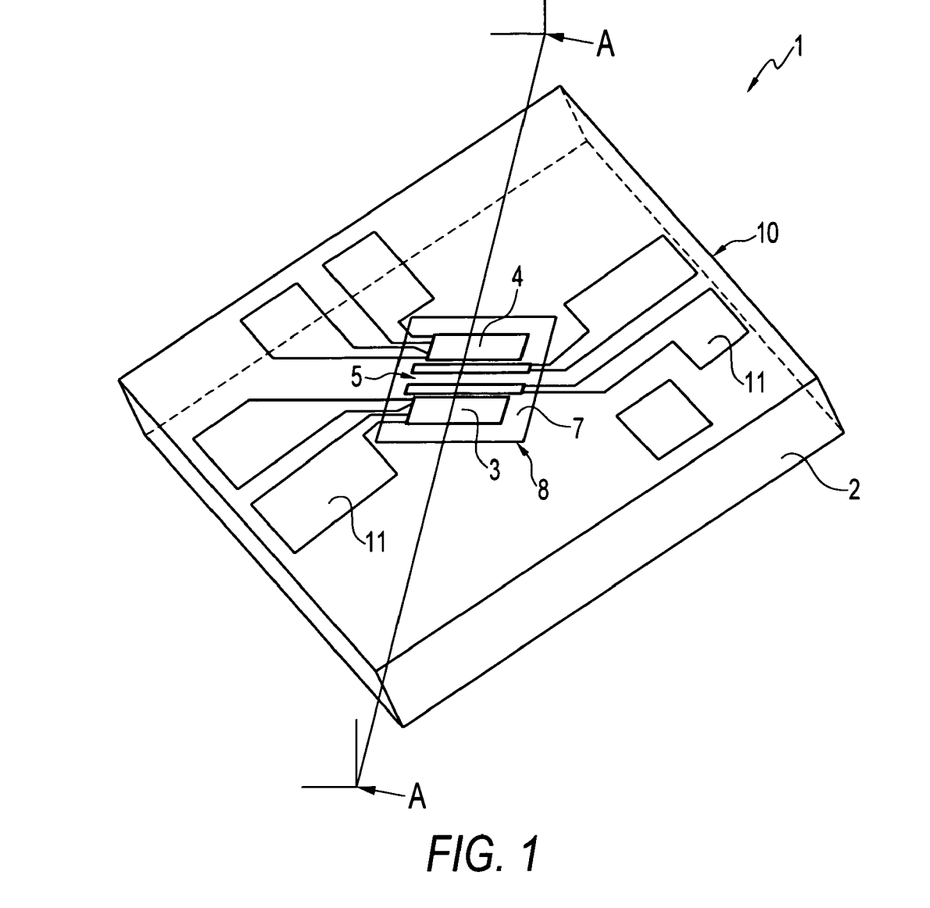
FIG. 1 illustrates a perspective view of a thermal liquid flow sensor according to a preferred embodiment.
Figure 2:
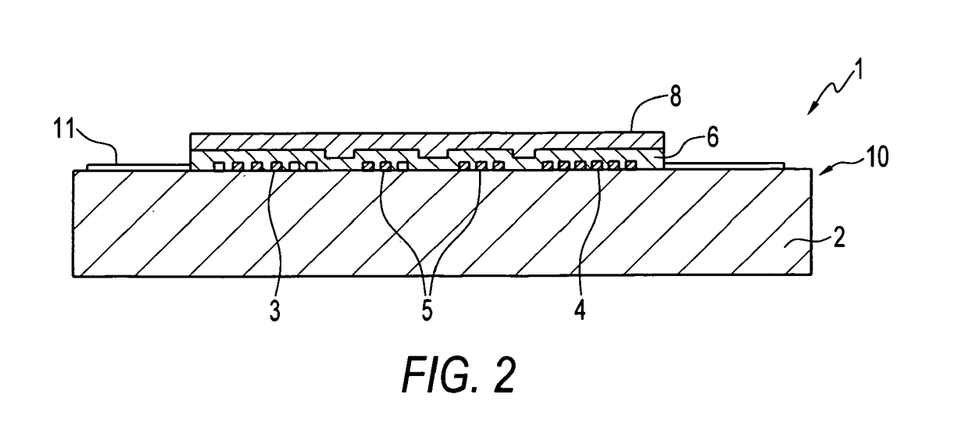
FIG. 2 illustrates a cross-sectional view taken along line A-A of FIG. 1.

Referring the accompanying drawings, FIG. 1 illustrates a perspective view taken from above the liquid flow sensor according to one embodiment and FIG. 2 illustrates a partial cross-sectional view taken along line A-A of FIG. 1. The liquid flow sensor 1 according to one embodiment generally includes a microstructure sensor die 10 having a substrate 2, a pair of temperature sensing resistive elements 3,4 formed on the substrate 2 and a heating resistive element 5, also formed on the substrate, between the temperature sensing elements. The sensing and heating elements 3,4,5 and a surface region of the sensor die surrounding the elements define an active sensing region 7. A hydrophilic layer 8 is formed on the active sensing region 7 so as to cover the sensing and heating elements 3,4,5. For the reasons explained in more detail below, the thermal liquid flow sensor 1 advantageously exhibits enhanced sensing performance as a result of a reduction in or elimination of sensor drift normally found in existing thermal liquid flow sensors.

Microsensor die 10 is fabricated in the form of a Microbrick® or microfill structure, such as detailed in U.S. Pat. No. 6,794,981 to Padmanabhan et al. which is incorporated herein by reference. The microbrick structure comprises a block of material, preferably a low thermal conductivity material, such as for example fused silica, fused quartz, borosilicate glass, or other glassy materials, providing a substantially solid structure beneath the heating/sensing elements 3, 4, 5. Resistive elements 3,4,5 have grid structures fabricated from a suitable metal, such as platinum or a permalloy, interconnected to bonding contact pads 11, located on a peripheral region of the substrate, to which can be bonded wires for passing signals between the elements and external circuitry. Alternatively, conductive vias can be formed through the substrate for electrically interconnecting the elements 3,4,5 to other components on the opposite side of the substrate. Chrome silicon (CrSi) or doped silicon thin film resistors or other types of silicon-based resistors can be employed as elements 3,4,5 instead of platinum.

In the illustrative embodiment shown in FIG. 1, the substrate 2 is fabricated from a glassy material so as to provide a more structurally robust liquid flow sensor. In order to sense high mass flux flow rates, it is also advantageous to have a substrate material with a low thermal conductivity. If it is too low, the output signal saturates at moderate fluxes (1 g/cm$^2$s); but if it is too high the output signal becomes too small. Certain glass materials provide better thermal isolation characteristics (than silicon), thus increasing the sensing capabilities of the above-outlined micromachined flow and property sensor. The use of glass also allows for a more robust physical structure to be used. These various characteristics result in a more versatile sensor which can be used in multiple applications.

Fabrication of the microsensor die 10 can be implemented by means of semiconductor and integrated circuit fabrication techniques apparent to those skilled in the art. Preferably, the microsensor die 10 is mass produced by means of wafer level processing techniques and subsequently singulated, that is, separated from adjacent packages, using known wafer dicing methods.

Preferably, the hydrophilic layer 8 is disposed on an insulating or dielectric layer 6, such as for example silicon nitride, which encapsulates the heating/sensing elements 3,4,5 (see FIG. 2). However, the encapsulating layer 6 as shown in FIGS. 1 & 2 can be omitted and the hydrophilic layer 8 can be disposed directly on the heating/sensing elements 3,4,5 thereby also serving as encapsulating layer for protecting the heating and sensing elements 3,4,5 from corrosion and other degradation caused by exposing the elements to the liquid.

The hydrophilic layer 8 advantageously reduces and can even eliminate null and span drift of the liquid flow sensor 1. Drift behavior in liquid flow sensors results from uncontrolled changes in the interface between the liquid and surface of the sensor which affects the thermal heat transfer of the sensor to the liquid. It has been determined that such drift in liquid flow sensing applications is generally caused by gas, dissolved in the liquid media being measured, releasing from the liquid solution and changing the heat transfer between the sensing elements and the liquid media. The release of gas from the liquid solution varies according to time and is affected by the temperature of the sensor heater. Also, the degree of hydrophobicity is a factor in the efficiency of gas rejection from the surface. Consequently, heat transfer between the surface of current sensors and the liquid media changes during sensing.

By providing a hydrophilic layer 8 on the active sensing region 7 of the microsensor die surface, the liquid flow sensor now has a hydrophilic surface which has a high affinity to liquid and which repels minute air bubbles away from the sensor surface. In this manner, hydrophilic layer has a strong affinity to liquid causing minute air bubbles to be forced away from the active surface region of the sensor during sensor operation. The hydrophilic layer 8 therefore advantageously preserves the sensor die surface 7 and liquid interface intact and heat transfer is not obstructed by gas bubbles or film. In order to maximize the effect of the hydrophilic layer 8, the layer is disposed on the sensing region area 7 and, preferably, over the entire substrate surface. However, reduction in drift may still be obtained by coating only the sensing and/or heater elements 3,4,5.

In the illustrative embodiment of FIG. 1, the hydrophilic layer 8 is preferably fabricated from a spin on glass material which can be a silicate, such as for example PB-ACCUFLO T30 commercially available from Honeywell Specialty Materials, 101 Columbia Rd. Morristown, N.J. 07962-2497, or a phosphosilicate, such as for example P114A, also commercially available from Honeywell Specialty Materials.

The hydrophilic layer 8 can, however, be fabricated from variety of other hydrophilic materials, such as, silicon nitride oxidized by means thermal or plasma oxidation or oxygen ion implantation, modified diamond-like carbon (DLC) and zeolites. Also, the hydrophilic layer 8 can be fabricated from polymer related compounds, such as fluorine-containing polymers having a hydrophilic functional group or a polyvinylpyrrolidonepolyurethane interpolymer, heat treated polyisocyanates and poly(carboxlic acid), polyacrylic acid polymers, acrylamide-acrylic acid copolymer, and N-vinlypyrrolidone on thermoplastic. Alternatively, other compounds having surface energies consistent with being hydrophilic can be used as the hydrophilic material, in particular, titania and a disperse phase constituted of silica or alumina, silanol group-bearing silicone resin and titanium oxide, silanol group-bearing silicone resin and titanium oxide, oligomer or polymer reactive with silanol, silicates, phosphosilicates, and hydrophilic metals, such as palladium (Pd), gold (Au), which metals are preferably sputter deposited.

A method of fabricating the liquid flow sensor, for example as shown in FIG. 1, will now by described with reference to FIG. 3, which illustrates a block diagram outlining the method steps for forming a thermal liquid flow sensor according to one embodiment.

Figure 3:
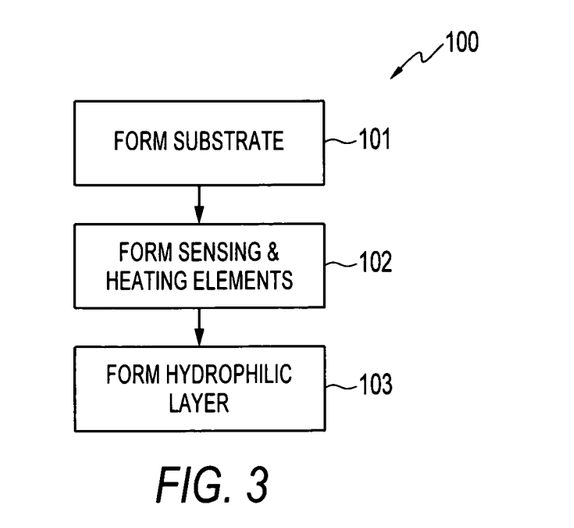
FIG. 3 illustrates a block diagram outlining method steps for forming a thermal liquid flow sensor according to one embodiment.

Initially, a substrate 2 is formed as indicated in block 101 of FIG. 3. In the example of FIG. 1, substrate 2 is fabricated from silica or fused quartz in the form of a microbrick® structure.

Thereafter, the sensing and heating elements are disposed on the substrate so as to form a sensor die, as indicated in block 102 of FIG. 3. Sensing and heating elements can be fabricated by known metal deposition techniques, such as physical vapor deposition or sputtering. If necessary, silicon nitride passivation layer can be deposited on the substrate preparatory to depositing the sensing and heating elements.

Following formation of the sensing and heating elements, a hydrophilic layer is formed on the sensing and heating elements as indicated in block 103. Preferably, the hydrophilic layer covers the entire active sensing region of the substrate, that is, the sensing and heating elements and a region of the substrate surrounding the elements, such that the entire active sensing region and liquid interface are preserved intact (see for example FIG. 1). In cases in which conductive pads are formed on the same surface of the substrate as the sensing and heating elements, such as for example in FIG. 1, the hydrophilic layer is preferably formed on the sensor die preparatory to opening the contact pads.

Preferably, the method is performed at the wafer level using conventional semiconductor and micro electro mechanical system (MEMS) equipment and fabrication techniques. A plurality of the microsensor dies are fabricated on the wafer and the hydrophilic layer is then formed on the microsensor dies so as to cover the sensing and heating elements. The microsensor dies are singulated using known dicing or sawing techniques so as to separate the microsensors from adjacent microsensors or other devices and then assembled on ceramic circuit boards. Wire leads can be wire bonded to the conductive contact pads by reflowing the solder pads using known solder reflow techniques. The resulting assembly is then packaged as required.

The method step 103 of forming the hydrophilic layer can be performed in a variety of ways. A method of forming a hydrophilic layer on a thermal liquid flow sensor of FIG. 1 according to an embodiment will now be described with reference to FIG. 7, which illustrates block diagram of the general steps of the method, and FIGS. 4 to 6, which depict formation of a hydrophilic layer on the sensor die of the sensor of FIG. 1.

As a general overview, the hydrophilic layer 8 is formed by applying a spin-on glass (SOG) material to the sensor die surface by a spin on glass technique apparent to those skilled in the art. SOG is a dielectric material that is typically employed in the microelectronic industry for interlevel and overcoat passivation in the manufacture of integrated circuits.

Initially, the microsensor die 10 is made to rotate, typically at rates between 500 rpm and 3000 rpm (block 301). Thereafter, a SOG material, typically a silicate, such as PB-ACCU- FLO T30, or phosphosilicate, such as P114A, is applied to the spinning substrate 2 (block 302). The spun on material is then dried and heated so as to cure the SOG coating and provide a smooth and uniform layer, as indicated in block 303. The Curing temperature is typically between about 250-350° C. However, the SOG coating can be cured at temperatures below 200° C. if low temperature processing is required. The SOG layer should be of sufficient thickness to provide the necessary function as a hydrophilic layer and sufficiently thin so as not to impede operation of the sensing and heating elements. A SOG thickness of the order of 1500 Å is appropriate in the illustrative embodiment of FIG. 1.

Figure 4:
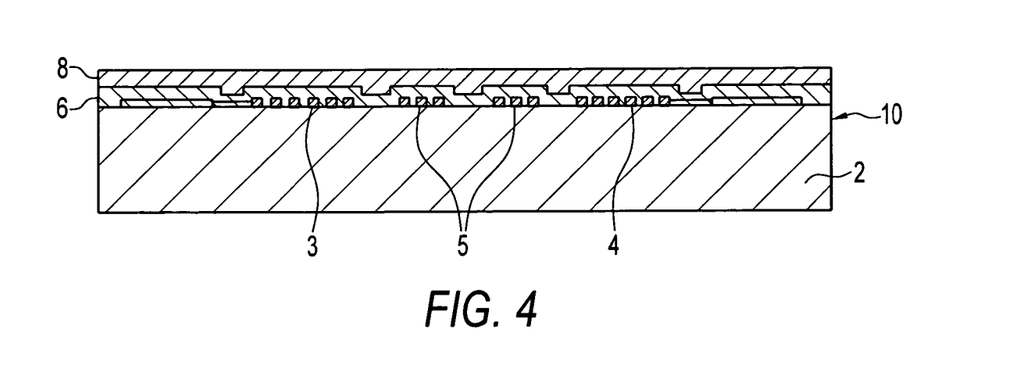
FIGS. 4 to 6, illustrate cross-sectional views depicting formation of a hydrophilic layer on the microsensor die shown in FIG. 1 according to an embodiment.

Preferably, however a SiNx or other suitable insulating or dielectric layer 6 is first deposited on the substrate 2 so as to encapsulate the sensing and heating elements 3,4,5, as indicated in FIG. 4 which depicts the SiNx layer 6 and SOG layer 8 sequentially formed on the substrate 2. The SiNx layer 6 is advantageous in that it minimizes the diffusion of moisture to the sensing and heating elements 3,4,5, whereas the SOG tends to planarize the surface over the elements. The SiNx layer 6 can be deposited by chemical vapor deposition (CV), low pressure chemical vapor deposition (LPCVD), plasma enhanced chemical vapor deposition (PECVD), sputtering or other known techniques. The required SiNx layer thickness is typically of the order of 8000 Å. The SOG material can alternatively be applied directly to the substrate and sensing/heating elements.

Figure 5:
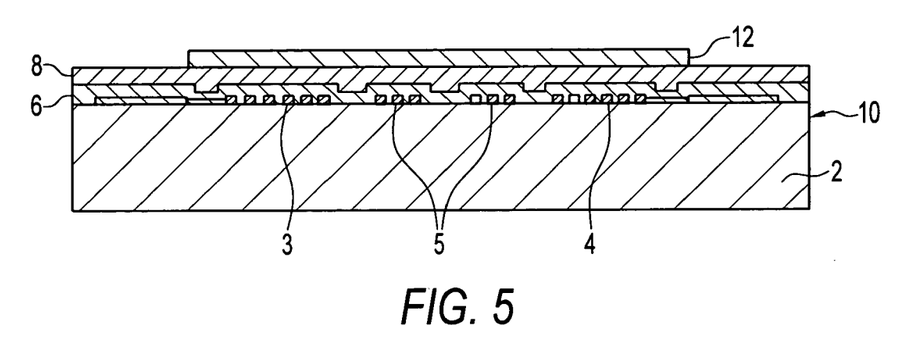
Figure 6:
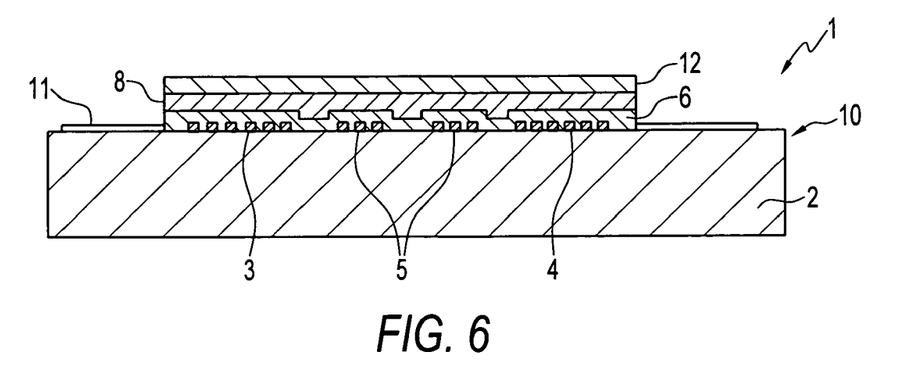
Figure 7:
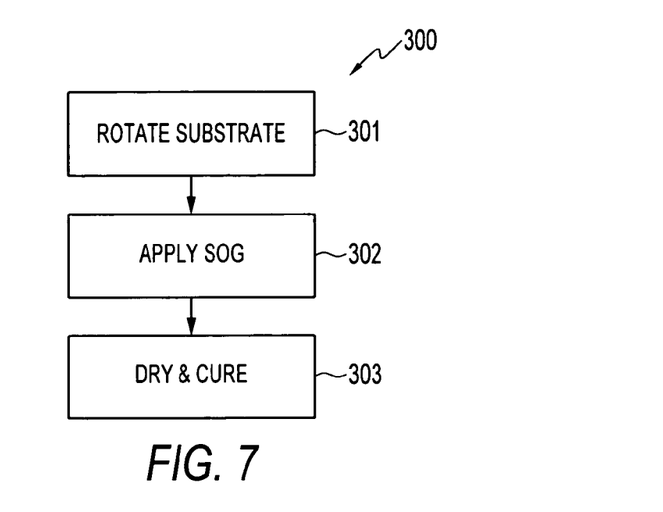
FIG. 7 illustrates a block diagram outlining method steps for forming a hydrophilic layer on a microsensor die of a thermal liquid flow sensor according to one embodiment.

Thereafter, portions of the SiNx and SOG layers 6, 8 covering the interconnecting conductive bonding pads 11 (see FIG. 1) are etched back so as to open the pads. Etching back of the SiNx and SOG layers can be performed by patterning a photoresist 12 applied to the substrate 2 and subsequently plasma etching the exposed SiNx and SOG layers 6,8 back to the bonding pads 11, as indicated in FIGS. 5 & 6. The photoresist can then be removed via plasma and wet positive resist strip as is known in the art thereby providing the thermal liquid flow sensor 2 shown in FIG. 1.

Etching back the SiNx layer 6 and SOG layer 8 is unnecessary if through the wafer conductive vias, rather than conductive pads 11, are formed in the substrate so as to connect the sensing and heating elements 3,4,5 to components on the underside of the substrate.

Manufacturability and cost are major drives for the selection of a suitable hydrophilic layer. Forming the hydrophilic layer by means of the SOG technique is advantageous in that the technique is generally employed in microelectronic fabrication facilities so that manufacture of the entire liquid sensor can be more easily implemented at low cost in the wafer fabrication environment.

The method of forming the hydrophilic layer 8 (step 103 of FIG. 4) can be implemented by means of microelectronic fabrication techniques other than SOG. For example, in one embodiment of the method, the hydrophilic layer 8 of FIG. 1 can be formed by oxidation of the SiNx layer 6. Oxidation of the SiNx layer 6 can be performed by various methods. The SiNx layer 6 can be exposed to an oxygen containing plasma, preferably a plasma containing energetic ions for promoting oxidation of the SiNx layer. Alternatively, low energy oxygen ion implantation of the SiNx layer or oxygen ion assisted deposition of the SiNx layer can be employed.

Other spin on techniques can be utilized to form the hydrophilic layer 8. For example, oligomer or polymer reactive with silanols can be spun on the substrate as an alternative to SOG materials and then heat treated accordingly.

Various other methods of forming the hydrophilic layer 8 are also possible. For example, in an alternative embodiment, the hydrophilic layer can be fabricated by means of deposition of diamond like carbon (DLC) on the SiNx layer. Preferably, the DLC is formed by means of ion beam deposition or PACVD at low temperature (<150° C.) or other techniques such as standard chemical vapor deposition or PECVD. DLC can be doped with N and/or B or amines or at least one polar inducing dopant or P, As, S, Sb, Ga and In. DLC ion beam deposition can be conducted in $C_2H_2$, $N_2/B_2H_2$ or $NH_3$. A variety of hydrocarbons can be used to form DLC, such as methane, acetylene, and/or benzene. The DLC hydrophilic layer can be deposited on the microsensor die with the aid of shadow mask after the contact pads have been opened.

In another embodiment, the hydrophilic layer 8 can be provided by a zeolite layer, for example, as disclosed in U.S. Pat. No. 6,500,490 entitled "Hydrophilic zeolite coating" issued to Yushan Yan on Dec. 31, 2002 and U.S. Pat. No. 6,849,568 entitled "Hydrophilic zeolite coating" also issued to Yushan Yan on Feb. 1, 2005 which are incorporated herein by reference. The zeolite layer disclosed in U.S. Pat. No. 6,500,490 can be formed from a synthesis solution comprising a structure directing agent, a base, a silicon source, an aluminum source, and a solvent. The synthesis solution comprises tetrapropylammonium hydroxide, sodium hydroxide, aluminum oxide, tetraethylorthosilicate, and water. The layer has a zeolite MFI structure and a composition having the formula of $M_n/m[Al_nSi_{(96-n)}O_{192}]$, or $[Al_nSi_{(96-n)}O_{192}]0.4[(CH_3CH_2CH_2)_4N-OH]$ wherein M is a metal ion of valence $m^+$ (e.g., $Na^{+}$) and $27>n>=0$.

Initially, the microsensor die 10 is placed in contact with the synthesis solution. While the substrate 2 and solution are in contact, a polycrystalline zeolite layer is formed on the substrate 2 to obtain a microsenor die coated with a zeolite composition layer having the aforementioned formula. After formation of the layer, the organic structure directing agent can be left intact inside the zeolite coating to make the coating corrosion resistant. Alternatively, and after removal of the organic structure directing agent, a biocidal metal ion can be incorporated into the coating by an ion exchange process to render the coating microbial resistant. A hydrophilic coating that is also corrosion resistant and microbial resistant can be made by a zeolite coating with two sub-layers—the bottom sub-layer being corrosion resistant and the top sub-layer being microbial resistant.

In accordance with another embodiment, the hydrophilic layer 8 can be formed by applying fluorine-containing polymer having a hydrophilic functional group to the substrate. The fluorine-containing polymer has a crystalline melting point of not less than 200° C. and can be applied using various techniques such as brushing, spraying, rolling, flowing, dipping, or spinning. The hydrophilic functional group is at least one of hydroxyl, carboxyl, salt of carboxylic acid, sulfonic acid group or salt of sulfonic acid.

In accordance with yet another embodiment, the hydrophilic layer 8 can be formed by applying polyvinylpyrrollidonepolyurethane interpolymer to the substrate using a dipping technique. This can be achieved by applying a polyisocyanate and usually a polyurethane in a solvent and then applying a polyvinylpyrollidone in a solvent.

In yet other embodiments, the hydrophilic layer 8 can be formed by dipping the substrate in polyisocyanates and applying heat and in poly(carboxylic acid) and applying heat or by dipping the substrate in polyacrylic acid polymers or acrylamide-acrylic acid copolymer. Multiple coatings can applied with drying between steps.

In yet another embodiment, the hydrophilic layer of 8 can be formed from titania and a disperse phase constituted of silica or alumina applied as a sol-gel and baked between 300 and 850° C.

In yet another embodiment, the hydrophilic layer of 8 can be formed by applying silanol group-bearing silicone resin+ titanium oxide to the substrate, such as for example by spraying, rolling, dipping, spinning, or brushing techniques and drying and UV curing.

In yet another embodiment, the liquid flow sensor has a thermoplastic substrate such as vinyl polymers; acrylate and methacrylate polymers; cellulose esters; polyethers; polyesters; and polycarbonates (not shown). Sensing and heating elements are arranged on the substrate in a similar manner to the sensing and heating elements of the liquid flow sensor of the first embodiment shown in FIG. 1. The hydrophilic layer can then be formed by dipping the substrate in N-vinylpyrrolidone so as to cover the sensing and heating elements.

Those skilled in the art would understand that the illustrations of FIGS. 1 & 2 are merely depicting one example of the embodiments and that the embodiments are not limited thereto. Whilst the liquid flow sensor of the illustrative embodiment shown in FIGS. 1 and 2 includes a microstructure sensor having a microsensor die with a Microbrick® or microfill structure, the microsensor die can have structures other than a microfill structure.

Figure 8:
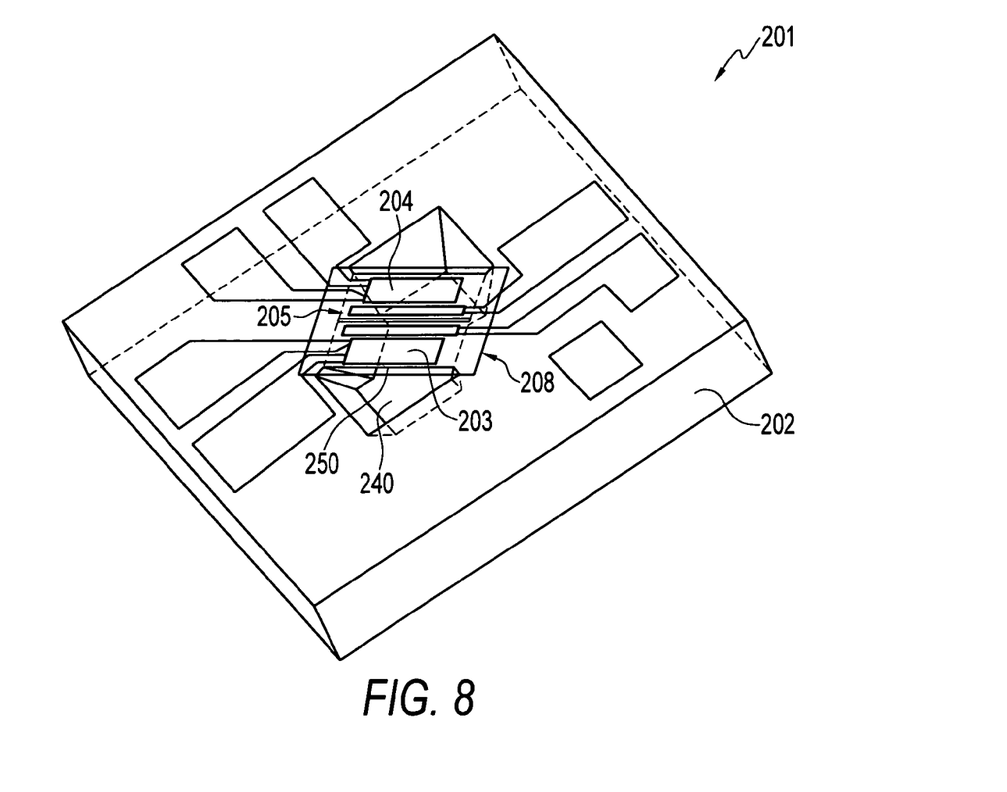
FIG. 8 illustrates a perspective view of a thermal liquid flow sensor according to another embodiment.

For example, the microsensor die can have a microbridge structure as shown in FIG. 8 which illustrates a perspective view of a liquid flow sensor according to another embodiment. A microbridge liquid flow sensor 201 has a flow sensor chip having a thin-film bridge structure 250 having a very small heat capacity, which is formed by a thin-film forming technique and an anisotropic etching technique, for example as disclosed in U.S. Pat. No. 5,050,429, entitled "Microbridge flow sensor", issued to Nishimoto et al on Sep. 24, 1991 and which is incorporated herein by reference. This sensor has many advantageous features, e.g., a very high response speed, high sensitivity, low power consumption, and good mass productivity.

A through hole 240 is formed in the central portion of a substrate 202 by anisotropic etching so as to communicate with left and right openings. A bridge portion 250 is integrally formed above the through hole 240 so as to be spatially isolated from the substrate 202 in the form of a bridge. As a result, the bridge portion 250 is thermally insulated from the substrate 202. A thin-film heater element 205 and thin-film temperature-measuring resistive elements 203,204 are arranged on the upper surface of the bridge portion 250 such that the element 205 is located between the elements 203,204. A hydrophilic layer 208 is formed on the upper surface of the bridge portion 250 so as to cover the elements 203,204,205. The same methods of formation of the hydrophilic layer described hereinbefore with reference to the thermal liquid flow sensor 1 shown in FIG. 1 can be utilized for the formation of the hydrophilic layer 208 of the liquid sensor 201.

Preferably, the hydrophilic layer 208 is coated on both faces of the bridge portion 250, for example by depositing a hydrophilic layer on the wafer surface prior to performing the sensor processing steps. Such a hydrophilic layer is resistant to etching processes utilized in the formation of the microsensor including etching of the substrate cavity/through hole. Alternatively, the hydrophilic layer can be formed by depositing a SiNx layer and modifying both surfaces of the bridge after the cavity formation. For example, the SiNx surfaces can be oxidized to form the hydrophilic layer by ozonation $O_3$ or via heat assisted plasma oxidation or low temperature CVD.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

For example, in the illustrative embodiments, the liquid flow sensors have pairs of temperature sensing elements and a heater, however, the liquid flow sensors can have any number of temperature sensing elements and/or heaters. Furthermore, those skilled in the art would understand that the liquid flow sensor can be any type of liquid flow sensor which is formed from a substrate and which has at least one sensing element disposed thereon capable of sensing a flow property of the liquid.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A thermal liquid flow sensor, comprising:
   a microsensor die comprising:
      a substrate;
      a heater disposed on said substrate;
      at least one pair of temperature sensing elements disposed on said substrate; and
      a hydrophilic layer comprising a fluorine-containing polymer, said fluorine-containing polymer having a hydrophilic functional group, and said hydrophilic layer being disposed on a surface region of said sensor die, said hydrophilic layer covering said at least one said temperature sensing elements and/or said heater.

2. The sensor of claim 1, wherein said sensor die is in the form of a microfill structure providing a substantially solid structure beneath said temperature and heating elements.

3. The sensor of claim 1, further comprising a silicon nitride (SiNx) layer encapsulating or disposed on said temperature sensing element(s), said silicon nitride layer interposing said substrate and said hydrophilic layer.

4. The sensor of claim 1, further comprising a protective layer encapsulating or disposed on said sensing elements, said protective layer interposing said substrate and said hydrophilic layer.

5. The sensor of claim 1, wherein said hydrophilic functional group comprises at least one of hydroxyl, carboxyl, salt of carboxylic acid, sulfonic acid group or salt of sulfonic acid.

6. A thermal liquid flow sensor, comprising:
   a microsensor die comprising:
      a substrate;
      a heater disposed on said substrate;
      at least one pair of temperature sensing elements disposed on said substrate;
      wherein said sensor die is fabricated in the form of a microfill structure providing a substantially solid structure beneath said temperature elements and said heater; and
      a hydrophilic layer comprising a fluorine-containing polymer, said fluorine-containing polymer having a hydrophilic functional group, and said hydrophilic layer being disposed on a surface region of said sensor die, said hydrophilic layer covering said at least one said temperature sensing elements and/or said heater.

7. The sensor of claim 6, further comprising a silicon nitride (SiNx) layer encapsulating or disposed on said temperature sensing element(s), said silicon nitride layer interposing said substrate and said hydrophilic layer.

8. The sensor of claim 6, further comprising a protective layer encapsulating or disposed on said sensing elements, said protective layer interposing said substrate and said hydrophilic layer.

9. The sensor of claim 6, wherein said hydrophilic functional group comprises at least one of hydroxyl, carboxyl, salt of carboxylic acid, sulfonic acid group or salt of sulfonic acid.

\* \* \* \* \*